Feb. 4, 1958 L. W. FRASER 2,822,465
OSCILLATOR TESTING APPARATUS
Filed Nov. 1, 1944 3 Sheets-Sheet 3
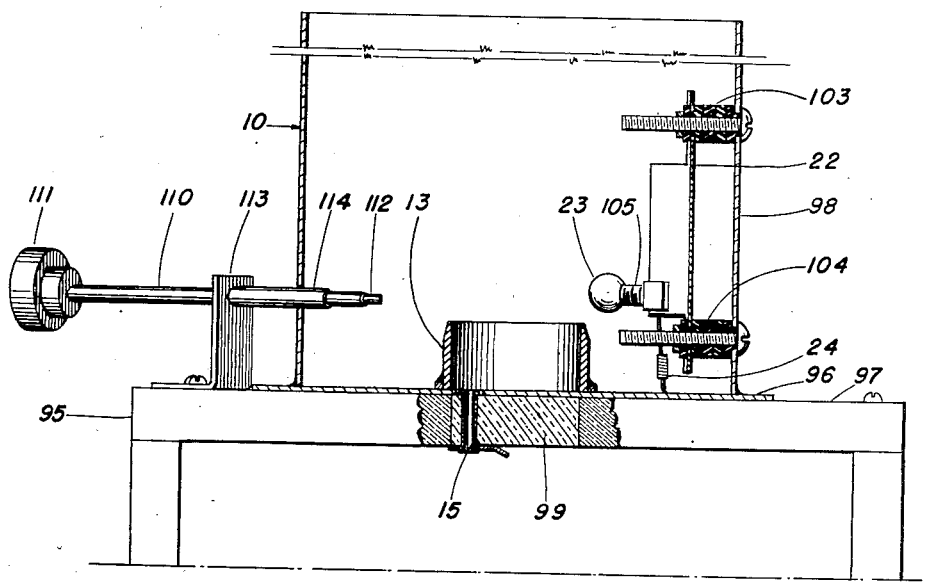
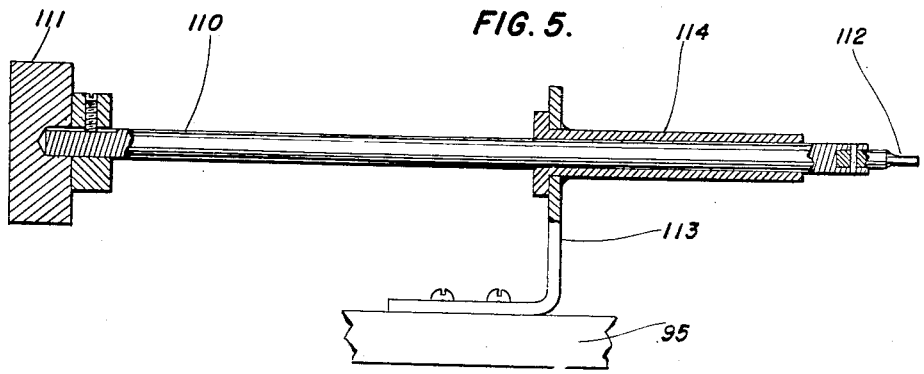
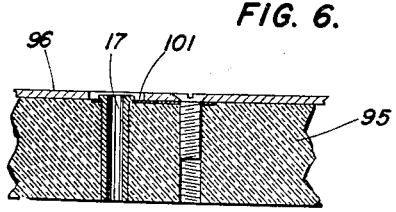
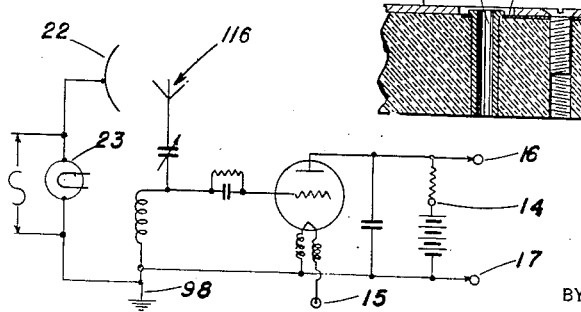
INVENTOR
LORENCE W. FRASER
ATTORNEY

United States Patent Office 2,822,465
Patented Feb. 4, 1958

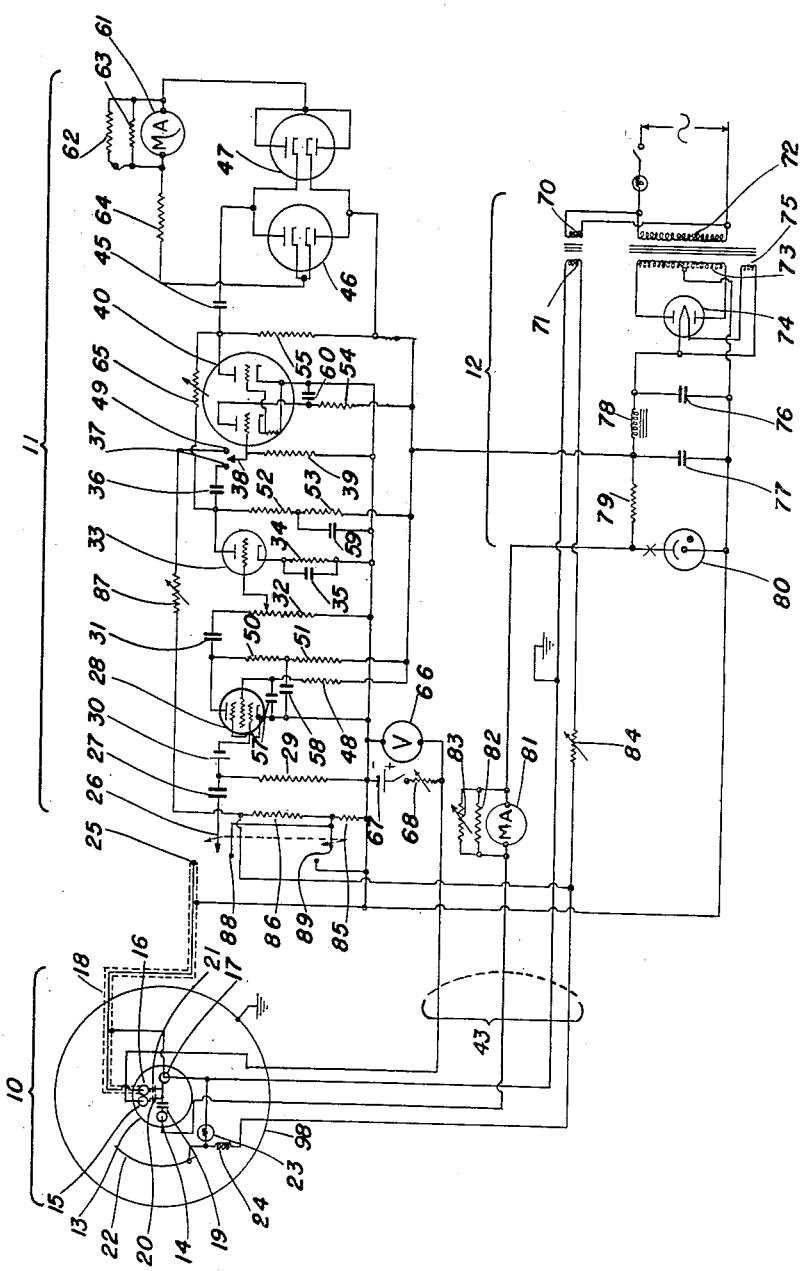
FIG. I.
INVENTOR
LORENCE W. FRASER
BY
ATTORNEY

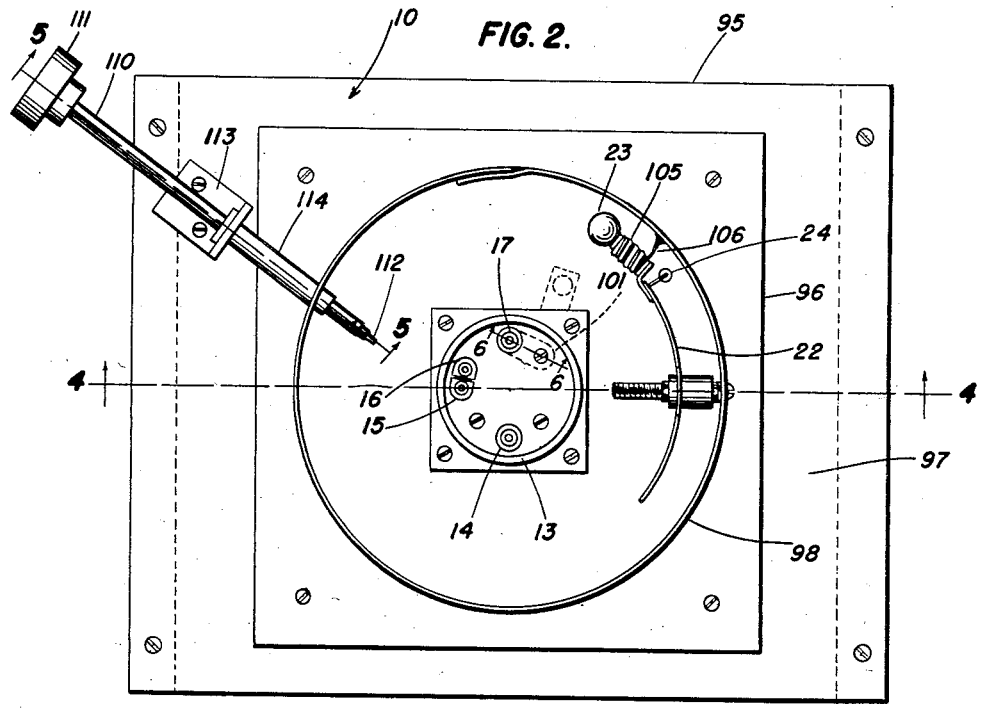
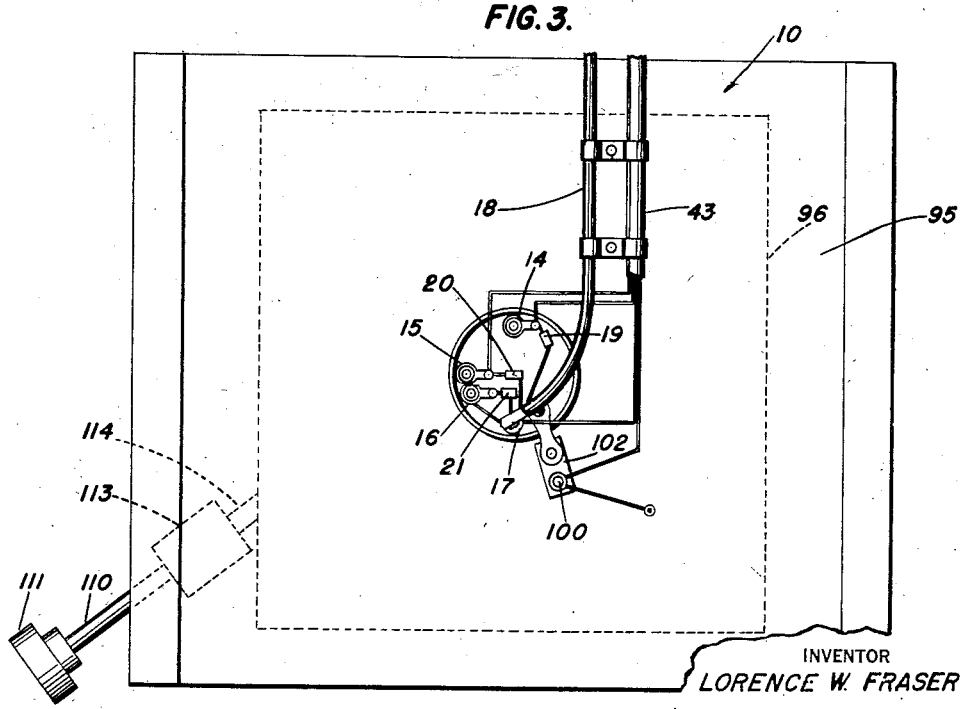

2,822,465

OSCILLATOR TESTING APPARATUS

Lorence W. Fraser, Silver Spring, Md., assignor to the United States of America as represented by the Secretary of the Navy Application November 1, 1944, Serial No. 561,449

8 Claims. (Cl. 250—17)

The present invention relates generally to testing apparatus for electronic signal generators and more particularly to devices for gauging or measuring a characteristic of electronic oscillators of the type which includes a radiator of high-frequency energy and which is adapted to generate a control signal in response to a change in the radiation resistance of the associated radiator or to a variation in loading.

While having a wide range of prospective application, the invention is of particular utility in the testing of oscillator devices of the type comprising an oscillator, an antenna, and an electrical plug adapted to be inserted into a complementary socket in the testing apparatus.

An important object of this invention is to provide an improved method and means whereby, when the specifications for the sensitivity and other desired characteristics of oscillators of the indicated class have been established, reliable tests of such oscillators may be made to determine conformity of performance to the specifications. The present invention aims to provide a reliable means and method for measuring the sensitivity of such oscillators and otherwise determining conformity of their characteristics to those desired.

Previous test procedure has involved moving a dipole antenna relative to the radiating means associated with the oscillator during energization of the oscillator and noting the sensitivity in terms of microamperes on a meter connected in the oscillator plate circuit, the oscillator being mounted on a laboratory table or on the roof of a building or suspended above ground between a pair of poles. Such a method of testing is subject to a serious disadvantage in that, since the change in loading of the oscillator is effected by raising or lowering it with respect to the ground, or by moving an antenna relative to it the surrounding objects and the personal equation involved necessarily introduce variations and spurious influences. This method is subject to a further disadvantage in that it has been found difficult to obtain satisfactory correlation between results obtained in testing large numbers of oscillators of identical construction. It is therefore an object of this invention to provide an oscillator testing apparatus which surmounts the above noted disadvantages, which is accurate, reliable, simple and convenient to use, and which affords ready indications of oscillator sensitivity and other desired characteristics in the manner previously outlined.

It is an object of the present invention to provide an improved testing device for gauging a characteristic of an oscillator of the general class under consideration, which simulates the conditions of intended normal operation of the oscillator and gauges its efficiency in or sufficiency for generating the control signal desired in practice.

Further objects of the invention will be made manifest by the following specification taken in conjunction with the appended claims.

In accordance with a feature of the present invention, a testing device for gauging the characteristics of an oscillator of the type having an output circuit and including a radiator of high frequency energy comprises an artificial load coupled to the radiator for imposing radiation resistance thereupon, means for varying the loading in a predetermined manner, and means for gauging the resultant signal in the output circuit of the oscillator. In accordance with an additional feature of the present invention, an oscillator testing apparatus comprises a receptacle in the form of a socket into which an oscillator having appropriate plug connections may be inserted for test, a shield surrounding the oscillator and the receptacle, means mounted on the shield for loading and for varying the loading of the oscillator, vacuum tube voltmeter means for determining the magnitude of the signal generated in the output circuit, and a unitary power supply means for furnishing operating potentials to the testing apparatus and oscillator.

The novel features which are believed to be characteristic of this invention are set forth with particularity in the appended claims. The invention itself, however, both as to its organization and method of operation, together with further objects and advantages thereof, will best be understood by reference to the following specification, taken in connection with the accompanying drawings, in which Figure 1 is a circuit diagram of an oscillator testing apparatus constructed in accordance with the invention; Figures 2 and 3 are plan and inverted plan views, respectively, of the mechanical elements of this embodiment of the invention; Figure 4 is a sectional view taken on line 4—4 of Figure 2; Figures 5 and 6 are fragmentary sectional views taken on lines 5—5 and 6—6, respectively, of Figure 2; Figure 7 is a circuit diagram of a particular type of oscillator adapted to be tested by the apparatus which forms the subject of the present invention, together with those circuit elements of the testing apparatus which are immediately associated with the oscillator.

Referring now specifically to Figure 1 of the drawings, there is represented a diagram of the electrical circuits incorporated in a preferred embodiment of the present invention. As previously stated, my improved system essentially comprises three groups of elements, viz: first, a fixture, 10, into which the oscillator to be tested is plugged; second, means generally designated 11 and essentially comprising a vacuum tube voltmeter for gauging or measuring the magnitude of the audio signal in the output circuit hereinabove referred to; and third, full-wave rectifier means 12 for furnishing desired operating potentials to the oscillator and modulation circuit contained in fixture 10 and to the voltmeter 11.

Fixture 10 incorporates circuit elements including means for varying the radiation resistance of the oscillator being tested, a shielded audio-frequency signal output circuit from which the generated signal whose magnitude is to be measured is translated to an associated indicating device and input circuits to which the power supply for the oscillator tube and the modulating means is coupled. The socket generally designated 13 constitutes a receptacle for the oscillator to be tested and includes a plurality of contacts 14, 15, 16 and 17, complementary to corresponding contacts on the oscillator base. Contact 14 is connected to the +B terminal of a suitable source of space current for the oscillator, which source is included in unit 12, as will be more fully indicated hereinafter. Contact 15 is connected to the positive or +A terminal of a suitable source of current for energizing the filament of the oscillator tube. Contact 17 is connected through the shield of cable 18 to the negative side of the last mentioned source and also to the negative side of the oscillator anode voltage source and thus constitutes the —A and —B terminal for the oscillator. Contacts 14, 15 and 16 are coupled through by-pass condensers 19, 20 and 21, respectively, to contact 17. Shielded cable 18, the inner conductor of which is connected to contact 16, the outer conductor of which is connected to contact 17, as has been mentioned, constitutes the audio lead-out for the oscillator unit to be tested. It will be understood that the oscillator desired to be tested includes a radiating element. The modulating plate 22 is adapted to be capacitively coupled to such radiating element when the oscillator is installed in the socket. Plate 22 is connected through a non-linear impedance element, shown as a bulb 23, to the oscillator ground terminal 17. The modulating circuit element 23 is energized by reason of its being coupled through radio-frequency choke 24 to the secondary winding 71 of a transformer supplied from an A. C. source ~.

The indicating system 11 comprises a vacuum tube voltmeter. In its main input system the inner conductor of cable 18 is coupled, through a terminal 25, a movable switch arm 26, and a coupling capacitor 27, to a control electrode of a pentode amplifier tube 28. Tube 28 includes in its input circuit a grid resistor 29 and an appropriate source of grid bias potential 30. The output circuit of tube 28 is coupled through coupling condenser 31 and variable grid resistor 32 to the input circuit of triode amplifier tube 33, the cathode of which tube is coupled to resistor 34, by-passed by capacitor 35, to provide appropriate grid bias potential. The output circuit of tube 33 is coupled through capacitor 36, contact 37, movable switch arm 38, and grid resistor 39, to a control electrode of the first or cathode-follower circuit included in a double triode tube 40. The cathode resistor comprising the output circuit in the first stage is coupled to a control electrode included in the second stage of tube 40. The second anode of double triode 40 is coupled through coupling capacitor 45 to an anode and a cathode of separate tubes of a diode bridge circuit comprising two double diodes 46 and 47.

The screen electrode of tube 28 is supplied with appropriate operating potentials by connection through resistor 48 to a high-voltage source included in unit 12 and the anodes of tube 28, tube 33, the first stage of tube 40, and the second stage of tube 40, are connected to the positive side of this high-voltage source through resistors 50—51, 52—53, 54, and 55 respectively. It will be noted that the several high potential output circuits are by-passed to ground through condensers 57, 58, 59 and 60. The terminal of load resistor 55 remote from the second anode of tube 40 is coupled to a second anode circuit of tube 46 and a second cathode circuit of tube 47. The output of the above-described vacuum tube voltmeter system is applied to indicating device 61, which may be a microammeter provided with suitable shunting resistors 62 and 63 and serially included in circuit with dropping resistor 64, the cathodes of tube 46, and the anodes of tube 47.

In order to provide means whereby the gain of the amplifier stages associated with tube 40 may be adjusted as desired the second output circuit of the tube is coupled through variable resistor 65 back to the first input circuit of the tube.

An accessory indicating device 66, preferably a voltmeter, is shunted across oscillator filament voltage source 67, which source is serially included in circuit with a rheostat 68 adapted to adjust such potential to the value desired.

The power supply unit 12 includes the transformer 70, 71 previously mentioned, which supplies the modulating signal to the load circuit and energizes the bulb 23 from the audio frequency source, which may comprise the conventional 60-cycle supply. The high voltage supply is derived from the same source through a transformer having a center-tapped secondary winding 73, the center tap constituting the ground lead for the high-potential circuits above described while the end terminals are connected to the anodes of full-wave rectifier tube 74. The cathode of the rectifier tube is energized from a separate secondary winding 75. The output circuit of the rectifier tube is coupled to a filter network of a conventional type comprising shunting capacitors 76, 77, series inductor 78, series resistor 79, and gas voltage-regulator tube 80. Included in the power output circuit furnishing anode current for the oscillator under test in fixture 10 is a milliammeter 81, provided with appropriate shunting resistors 82 and 83.

Referring now particularly to the accessories incorporated in the preferred embodiment of the invention being described, indicating device 81 constitutes a means for measuring the direct current flowing in the plate circuit of the oscillator and thus for indicating the percentage of oscillator loading. Meter 61, the main indicating device included in vacuum tube voltmeter 11, is so arranged as to indicate the variations in amplified oscillator plate current occasioned by the modulation of the oscillator output. Another accessory is the variable resistor 84, adapted to vary the amplitude of the modulating voltage.

In order that the testing apparatus may be made self-calibrated as to the gain of the amplifier system included therein, an alternative calibration-input circuit to the vacuum tube volt-meter is provided. This circuit includes serially related resistors 85 and 86, connected at their junction to a contact 88 so as to constitute a voltage divider. When the testing device is in normal operation switch arm 26 is closed on contact 25 so that the oscillator audio signal is fed through the amplifier and rectifier circuits to meter 61. However, when it is desired to calibrate the testing device with reference to amplifier gain, arm 26 is closed on contact 88, thus open-circuiting contact 25 and placing the voltage divider in shunt across the oscillator load signal supply 71 and bulb 23. Further, when arm 26 is closed on contact 88 a switch 89, ganged with the switch including arm 26 and normally closed to maintain this calibration circuit at ground potential, is open, whereupon only that proportion of the bulb voltage appearing across resistor 85 is applied to the vacuum tube voltmeter, on the high potential side through contact 88, arm 26, and condenser 27, to the grid of tube 28, and on the low potential side directly to the cathode of tube 28.

To test amplifier gain a small portion on the order of 1% of the voltage of bulb 23 is thus directly applied to the input of the vacuum tube voltmeter 11. This voltage is amplified and rectified in the same manner and causes a needle deflection on meter 61. When the audio level necessary for proper operation is determined the bulb voltage may be adjusted by rheostat 84 until a desired deflection is obtained. Likewise a desired deflection may be obtained by an adjustment of feedback control 65 and/or grid resistor 32.

The testing device also includes means for measuring the voltage of bulb 23 directly by the use of the vacuum tube voltmeter 11. Assuming that the calibration circuit hereinabove referred to has been placed in operative condition by appropriate positioning of the ganged switches, in order to permit such direct measurement of bulb voltage there is provided a connection between the high-potential side of resistor 86 through variable resistor 87, contact 49, and switch arm 38 to the input or control electrode circuit of the first amplifier stage associated with tube 40. Although in normal operation, that is, when an oscillator test is being conducted, switch arm 38 is positioned on contact 37, switch arm 38 is now positioned on contact 49, closing the circuit between bulb 23 and the input circuit of tube 40. Independent tests with and without 28 and 33 in circuit enable checking gain in these stages. The deflection of meter 61 acting as a voltmeter under the assumed condition may then be recorded. Thus the relationships among bulb voltage, amplifier gain and meter deflection may be determined for any desired number of settings.

Reference is now made more particularly to Figure 2 of the drawings for a description of the fixture 10. The fixture comprises a base supporting panel 95, formed of a suitable insulating material. Mounted on the upper surface of the base is a square plate 96, formed of copper. Plate 96 is smaller in size than base 95 so that a margin 97, surrounding the plate, is defined. Soldered to plate 96 is a cylindrical metallic shield 98 (shown in sectional elevation in Figure 4). Mounted in a central opening in panel 95 is a lucite connector block 99, forming the base of socket 13 and supporting the contacts, 14, 15, 16 and 17. Contact 15 is shown in Figure 4 and the disposition of the four contacts is indicated in Figures 2 and 3. The contacts bear the same reference numerals as the symbolic representations thereof in Figure 1, already described. As illustrated in Figure 4, contacts 14, 15, and 16 are insulated from plate 96 by reason of enlargements of the apertures in the plate through which the contacts project. A socket sleeve, to which the numeral 13 is applied, is provided to insure accurate location of the oscillator assembly and is soldered to plate 96. Figure 6 shows the details of the ground connection of contact 17, which is grounded to plate 96 by a strip of conductive material 101.

Figure 3 illustrates the relationship between the fixture 10 and its associated electrical circuit elements hereinabove described. The shield of cable 18 is grounded to contact 17 and the internal conductor of cable 18 is connected to contact 16 to constitute one of the output terminals of the oscillator. Cable 43 contains the oscillator filament positive lead, the oscillator plate supply high-voltage lead, the alternating current load return and lead, which are connected respectively to contact 15, contact 14, contact 17, and choke 24. The lead to choke 24 is connected to the lead from variable resistor 84 at binding post 100 mounted on the insulating supporting strip 102.

Having described fixture 10 in its relationship to the power supply system 12 and the voltmeter system 11, reference is now particularly made to Figure 4 for a description of the modulating elements associated with the fixture. Mounted on shield 98 for the purpose of loading and varying the radiation resistance of the radiator of high-frequency energy associated with the oscillator to be tested is a means comprising a modulating plate and a non-linear impedance element. The modulating plate 22 is a sheet of conductive material so positioned as to be electrostatically coupled to the oscillator radiator. The modulating plate is spaced and insulated from shield 98 by washers 103, 104 and threaded bolts so arranged that the spacing between the modulating plate and the radiator may be adjusted as desired. One of the terminals of a socket 105 (see Figure 2) into which bulb 23 is screwed is connected to choke 24, from which the circuit continues to cable 43 as hereinabove indicated. This terminal is also connected to the modulating plate. The remaining terminal of socket 105 is grounded as indicated at 106 in Figure 2. Bulb 23 is therefore included as a non-linear impedance in the radio-frequency path of the oscillator to be tested while modulating plate 22 couples a load to the oscillator and imposes radiation resistance on its radiator. This radio-frequency path includes the oscillator radiator, modulating plate 22, bulb 23, the ground plate 96, contact 17, and the tank circuit of the oscillator.

Mounted on base 95 with the shaft thereof projecting through shield 98 and in position to be utilized for adjustment of a tuning condenser associated with the oscillator to be tested is an adjusting device. As shown in Figure 5 it also comprises a sleeve 114 to which shaft 110 is slidably and rotatably secured, a manual adjustment knob 111, a driving head 112 and a bracket 113 for mounting the adjusting device on base 95.

Figure 7 represents the relationship of a typical oscillator to be tested to the radio-frequency path provided by the modulating plate 22 and non-linear impedance 23. An oscillator indicated generally at 116 is of the class specifically described in the copending patent application of Gilbert R. Bushong, entitled "Oscillator-Thyraton Circuit," Serial No. 479,521, filed March 17, 1943, to which reference is made for a complete description thereof. It will be noted that the radiator associated with the oscillator is electrostatically coupled to modulating plate 22 and that bulb 23 is included in the radio frequency path thereof. Figure 7 also shows the relationship of the oscillator circuits to contacts 14, 15, 16 and 17 hereinabove described.

Coming now to a description of the operation of the preferred embodiment of the invention, it will be assumed that the aforementioned adjustments and calibrations have been made by utilizing an oscillator whose characteristics are known, that the various switches are in position for normal operation, that power supply 12 is operative, and that an oscillator has been plugged into receptacle 13. Shield 98 then effectively shields the oscillator from all electromagnetic and electrostatic influences other than those of modulating plate 22 and non-linear impedance 23. Modulating plate 22 couples a load to the oscillator and is, as noted above, in the radio frequency path thereof. The audio frequency signal from winding 71 modulates the radio frequency carrier energy of the oscillator to vary the radiation resistance of its radiator at an audio-frequency rate. The variations in radiation resistance of the oscillator cause corresponding variations of oscillator anode or plate current, these variations appearing in the form of an audio-frequency component or signal which is translated through cable 18 to the input circuit of tube 28, where it is amplified and then applied to the input circuit of tube 33 for reamplification. Thereafter the audio-frequency signal is successively applied to the two amplifier stages of tube 40 for further amplification. The finally amplified audio-frequency signal appears in load resistor 55. Diode tubes 46 and 47 rectify the audio component appearing across the load resistor and apply it to sensitivity meter 61 the deflection of which indicates the magnitude thereof. Thus it will be observed that the voltmeter 11 is effective to indicate the magnitude of the audio-frequency signal generated in the output of the oscillator in response to variations in its radiation resistance and therefore serves to indicate the sensitivity characteristic of the oscillator either absolutely or relatively by comparison to a chosen standard.

As illustrative of a specific embodiment of the invention, the following circuit data for the electrical system represented in Figure 1 are given:

Tube 28_____ 6SJ7.
Tube 33_____ 6C5.
Tube 74_____ 5Y3G.
Tube 40_____ 6N6G.
Tube 46_____ 6H6.
Tube 80_____ VR90.
Tube 47_____ 6H6.
Resistor 86_____ 99,000 ohms.
Resistor 85_____ 1,000 ohms.
Resistor 68_____ 20 ohms.
Resistor 48_____ 2 megohms.
Resistor 50_____ 0.5 megohm.
Resistor 51_____ 50,000 ohms.
Resistor 32_____ 0.5 megohm.
Resistor 34_____ 5,000 ohms.
Resistor 52_____ 100,000 ohms.
Resistor 53_____ 15,000 ohms.
Resistor 39_____ 0.5 megohm.
Resistor 54_____ 15,000 ohms.
Resistor 64_____ 10,000 ohms.
Resistor 55_____ 7,000 ohms.
Resistor 62_____ Proper resistance to shunt meter 61 to double range.
Resistor 79_____ 15,000 ohms.
Resistor 83_____ 3,500 ohms.
Resistor 87_____ 400,000 ohms maximum.

| | |
|---|---|
| Resistor 82 | Proper resistance to shunt meter 81 to the range 0–15 milliamperes. |
| Resistor 63 | Proper resistance to shunt meter 61 to the range 0–3 milliamperes. |
| Meter 61 | 0–500 microamperes. |
| Meter 66 | 0–1.5 volts. |
| Plate voltage supply to voltmeter tubes | 400 volts. |
| Plate voltage supply to oscillator | 90 volts. |
| Oscillator filament voltage supply | 1.5 volts. |
| Grid bias voltage supply for tube 28 | 1.25 volts. |
| Bulb 23 | GE Mazda #502. |
| Cable 18 | Amphenol microphone cable. |
| Choke 14 | Standard T-3 Oscillator choke. |
| Rectifier input voltage | 60 cycles, 110 volts, A. C. |
| Capacitor 19 | 50 micro-microfarads. |
| Capacitor 20 | 50 micro-microfarads. |
| Capacitor 21 | 50 micro-microfarads. |
| Capacitor 27 | 0.1 microfarad. |
| Capacitor 57 | 0.1 microfarad. |
| Capacitor 58 | 8 microfarads. |
| Capacitor 35 | 50 microfarads. |
| Capacitor 59 | 8 microfarads. |
| Capacitor 36 | 0.1 microfarad. |
| Capacitor 60 | 8 microfarads. |
| Capacitor 45 | 1 microfarad. |
| Capacitor 77 | 8 microfarads. |
| Capacitor 76 | 16 microfarads. |

While there has been considered what is at present regarded to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A testing device for gauging a characteristic of an oscillator of the type having an output circuit and including a radiator of high frequency energy comprising an artificial load coupled to said radiator for imposing radiation resistance thereupon, means for varying said radiation resistance in a predetermined manner, and means for gauging the resultant signal in said output circuit.

2. A testing device for gauging the sensitivity of an oscillator of the type having an output circuit and including a radiator of radio-frequency energy comprising an artificial load including a conductive modulating member electrostatically coupled to said radiator and a non-linear impedance in circuit with said member, means for applying an audio-frequency voltage to said impedance, and means for gauging the resultant signal in said output circuit.

3. A testing device for measuring the sensitivity of an oscillator of the type having an audio-signal output circuit and including a radiator of radio-frequency energy comprising means including modulating signal means and a nonlinear impedance coupled to said radiator for varying the radiation resistance thereof within a predetermined range thereby to introduce an audio-frequency signal in said output circuit, and means for measuring the magnitude of said signal.

4. A testing device for gauging the sensitivity of an oscillator of the type having an anode circuit and including a radiator of radio-frequency energy comprising means for varying the radiation resistance of said radiator within a predetermined range at an audio-frequency rate, thereby to introduce an audio-frequency signal component in said anode circuit, and vacuum tube voltmeter means for measuring the magnitude of said component.

5. A testing device for gauging the sensitivity of an oscillator system of the type having an anode circuit and including a radiator of radio-frequency energy comprising means for varying the radiation resistance of said radiator within a predetermined range and at an audio-frequency rate, thereby to introduce an audio-frequency signal component in said anode circuit, means for amplifying said audio-frequency component, means for rectifying the resultant amplified component, and an indicating device responsive to said rectified component for gauging the sensitivity of said oscillator.

6. A testing device for measuring a characteristic of an oscillator of the type having an output circuit and including a radiator of radio-frequency energy comprising modulating means for varying the radiation resistance of the radiator within a predetermined range and at an audio-frequency rate, thereby to cause a signal to be generated in the output circuit of said oscillator, and means including an indicating device for measuring the magnitude of said signal.

7. A testing device for measuring the sensitivity of an oscillator of the type having an output circuit and including a radiator of radio-frequency energy comprising serially related capacitance and resistance providing a path for radio-frequency energy radiated from said radiator, means for imposing an audio-frequency signal on said resistance, thereby cyclically to vary said resistance and means for measuring the magnitude of the resultant signal in said output circuit.

8. A testing device for gauging a characteristic of an oscillator of the type having an output circuit and including a radiator of high-frequency energy comprising a contact socket for an oscillator to be tested, a shield adapted to surround said oscillator, means mounted on the shield for varying the radiation resistance of said radiator, said means comprising a modulating plate and a nonlinear impedance element, indicating means for gauging the signal in said output circuit in terms of a desired oscillator characteristic, and a unitary power supply system electrically coupled to complementary contacts in said receptacle for supplying operating potentials to said device.

References Cited in the file of this patent

UNITED STATES PATENTS

| | | |
|---|---|---|
| 1,996,847 | Zimmerman et al. | Apr. 9, 1935 |
| 2,272,768 | Crobsy | Feb. 10, 1942 |
| 2,290,327 | Hansell | July 21, 1942 |
| 2,239,625 | Kentner | Sept. 14, 1943 |

FOREIGN PATENTS

| | | |
|---|---|---|
| 48,033 | Denmark | Nov. 20, 1933 |